US011044337B2

(12) United States Patent
Hayward et al.

(10) Patent No.: US 11,044,337 B2
(45) Date of Patent: Jun. 22, 2021

(54) RUNTIME LOCALIZED MESSAGES FOR CLOUD SERVICES

(71) Applicant: International Business Machines Corporation, Armonk, NY (US)

(72) Inventors: Jared R. Hayward, Southport (AU); John William Court, Carrara (AU); Craig Kowald, Robina (AU)

(73) Assignee: International Business Machines Corporation, Armonk, NY (US)

( * ) Notice: Subject to any disclaimer, the term of this patent is extended or adjusted under 35 U.S.C. 154(b) by 58 days.

(21) Appl. No.: 16/129,631

(22) Filed: Sep. 12, 2018

(65) Prior Publication Data

US 2020/0084295 A1    Mar. 12, 2020

(51) Int. Cl.
| | | |
|---|---|---|
| *G06F 15/16* | (2006.01) | |
| *H04L 29/08* | (2006.01) | |
| *H04L 12/58* | (2006.01) | |
| *H04L 29/06* | (2006.01) | |

(52) U.S. Cl.
CPC .......... *H04L 67/327* (2013.01); *H04L 51/046* (2013.01); *H04L 67/18* (2013.01); *H04L 67/2823* (2013.01); *H04L 69/08* (2013.01)

(58) Field of Classification Search
CPC ..... H04L 67/327; H04L 51/046; H04L 67/18; H04L 67/2823; H04L 69/08
USPC ....................................................... 709/246
See application file for complete search history.

(56) References Cited

U.S. PATENT DOCUMENTS

| | | | | |
|---|---|---|---|---|
| 9,026,994 B2* | 5/2015 | Zhang | ....................... | G06F 8/70 |
| | | | | 717/120 |
| 9,369,433 B1* | 6/2016 | Paul | ....................... | G06F 21/572 |
| 9,405,532 B1* | 8/2016 | Sullivan | ................... | G06F 8/71 |
| 9,565,198 B2* | 2/2017 | Sharif | ................. | H04L 63/0823 |
| 2002/0162093 A1* | 10/2002 | Zhou | ....................... | G06F 9/454 |
| | | | | 717/130 |
| 2011/0054776 A1* | 3/2011 | Petrov | ................ | G01C 21/3694 |
| | | | | 701/533 |
| 2012/0054599 A1* | 3/2012 | Nixon | ................ | G05B 19/4183 |
| | | | | 715/236 |
| 2013/0304713 A1* | 11/2013 | Roy-Faderman | .......................... | |
| | | | | G06F 16/2365 |
| | | | | 707/702 |
| 2014/0259194 A1* | 9/2014 | Lemont | .................... | A01H 5/12 |
| | | | | 800/260 |
| 2015/0088777 A1* | 3/2015 | Chauhan | .............. | G06Q 50/265 |
| | | | | 705/325 |

(Continued)

OTHER PUBLICATIONS

Luke Collins and Frank Fowley, Rule-based Cloud Service Localisation, School of Computing, Dublin City University, Dublin Ireland (Year: 2013).*

(Continued)

*Primary Examiner* — Anthony Mejia

(57) ABSTRACT

An example operation may include one or more of receiving a network request from a client device, detecting that a pre-established policy of a cloud tenant has been triggered based on content included in the received network request, identifying a locale of the client device, retrieving, at runtime, a tenant message in response to the triggered policy and a custom translation of the tenant message based on the identified locale, and transmitting the custom translation of the tenant message to the client device.

22 Claims, 6 Drawing Sheets

(56) References Cited

U.S. PATENT DOCUMENTS

| | | | |
|---|---|---|---|
| 2015/0229645 A1* | 8/2015 | Keith | G06F 21/53 |
| | | | 726/4 |
| 2016/0014057 A1 | 1/2016 | Gudla et al. | |
| 2016/0283228 A1 | 9/2016 | Sullivan | |
| 2018/0246921 A1* | 8/2018 | Henvy | G06F 16/23 |
| 2018/0373684 A1* | 12/2018 | Henvy | G06F 16/907 |
| 2019/0370218 A1* | 12/2019 | Di Pietro | G06K 9/6263 |
| 2019/0372859 A1* | 12/2019 | Mermoud | H04L 41/16 |

OTHER PUBLICATIONS

StackOverflow, How to internationalize a java web application, Nov. 2010, https://stackoverflow.com/questions/4276061/how-to-internationalize-a-java-web-application (Year: 2010).*

Claus Pahl, Cloud Service Localisation, 2012, Springer Link, European Conference on Service-Oriented and Cloud Computing.

Luke Collins and Frank Fowley, Rule-based Cloud Service Localisation, School of Computing, Dublin City University, Dublin Ireland.

* cited by examiner

RUNTIME LOCALIZED MESSAGES FOR CLOUD SERVICES

TECHNICAL FIELD

This application generally relates to a system for localizations of messages for cloud services, and more particularly, to a system in which a cloud service identifies and transmits custom localized translations of a tenant message at runtime.

BACKGROUND

Internationalization (i18n) is the process of designing and building a software application to facilitate localization of content. The objective is that an application can be adapted to various languages and regions without engineering changes. Furthermore, localization (110n) is the cultural and linguistic adaptation of an internationalized application to two or more culturally-distinct markets. Localization is used to translate content such as user interface elements and documentation based on locale. Furthermore, localization may also include other relevant changes to content such as display of numbers, dates, currency, and so on, based on locale. Other types of data, such as sounds and images, may require localization if they are culturally sensitive. The better internationalized an application is, the easier it is to localize it for a particular language and character encoding scheme.

Cloud services are provided to tenants of the cloud at large-scale level (e.g., globally) which results in tenants requiring many different permutations for content based on factors such as local policy, compliance requirements, cultural factors, and the like. Different events can trigger messages output to client systems of the tenant. These events may be based on policies or rules which are created by administrators. Present cloud services perform standard localization of event messages on a cloud provider level. In particular, a cloud service builds a message repository at compile time and then performs a simple lookup of the message during execution. Furthermore, each tenant receives the same standard localized messages.

However, the amount and the type of messages that are provided by cloud services on behalf of tenants are significantly limited due to localization of the messages at compile time. Furthermore, different tenants may have different needs and desire messages which provide content differently to respective users, and the like. Accordingly, what is needed is an improved mechanism for localizing messages for cloud tenants.

SUMMARY

One example embodiment may provide a system that includes one or more of a network interface configured to receive a network request from a client device, and a processor configured to detect that a pre-established policy of a cloud tenant has been triggered based on content included in the received network request, identify a locale of the client device, and retrieve, at runtime, a tenant message in response to the triggered policy and a custom translation of the tenant message based on the identified locale, wherein the processor may further control the network interface to transmit the custom translation of the tenant message to the client device.

Another example embodiment may provide a method that includes one or more of receiving a network request from a client device, detecting that a pre-established policy of a cloud tenant has been triggered based on content included in the received network request, identifying a locale of the client device, retrieving, at runtime, a tenant message in response to the triggered policy and a custom translation of the tenant message based on the identified locale, and transmitting the custom translation of the tenant message to the client device.

A further example embodiment may provide a non-transitory computer readable medium comprising instructions, that when read by a processor, cause the processor to perform one or more of receiving a network request from a client device, detecting that a pre-established policy of a cloud tenant has been triggered based on content included in the received network request, identifying a locale of the client device, retrieving, at runtime, a tenant message in response to the triggered policy and a custom translation of the tenant message based on the identified locale, and transmitting the custom translation of the tenant message to the client device.

DETAILED DESCRIPTION

Figure 1:
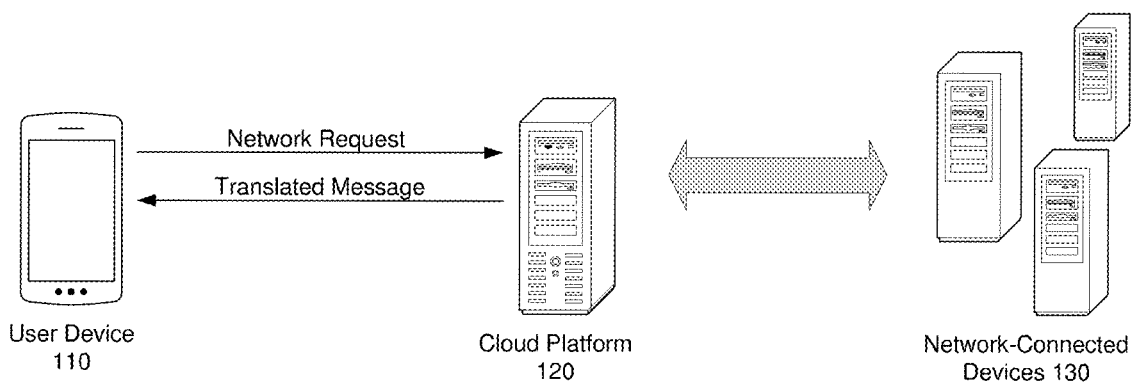
FIG. 1 is a diagram illustrating a cloud environment providing custom localization-based message according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments are directed to methods, devices, networks and/or systems, which support customization of event messages and custom localization of the events messages for cloud services, at runtime. A cloud tenant, or simply a tenant, may generate and provide a list of policies which limit or otherwise protect network access of its users to the cloud service. The tenant may place policy restrictions on users and/or groups who access the network, websites that can be accessed, content-type that can be accessed, and the like. Furthermore, the tenant may dictate the message content that is provided when policy responses are triggered. The tenant may further customize translated versions of the message for different locales. Accordingly, polices, events fired, and messages resulting from such events, can be customized by the tenant instead of by the cloud service provider.

A cloud service may analyze traffic that occurs on a tenant-by-tenant basis. Each tenant may have their own policies which, when triggered, cause different events such as messages to be transmitted by the cloud service to the user which has triggered the policy. A message may indicate that the requested content is allowed, a warning that such content might be harmful, a notice that the content has been blocked and a reason, and the like. Each locale may have its own cultural language and nuances that can differ from locale-to-locale. The example embodiment enable a tenant to define their own custom events, to set their own custom messages on a per event basis as well as provide their own localizations for custom messages. This means that a cloud service can deliver a custom message based on a matrix of tenant, event or user, and language. The system herein can both pull messages based on an identified locale of the client/user and push the messages to the user device.

In some embodiments, a custom translation is not provided for every possible locale. In this example, when the user/client is identified as being located within a locale that is not specifically provided for in the custom message database, the system may gracefully fall back on a more generic translation of the message. For example, when a client device is identified as being in a locale the corresponds to an English/European translation of the message, and such locale message is not present in the database, the service may fall back on a more generic English version of the message. Accordingly, a tenant does not need to provide a custom translation for every possible locale, but may relay on a graceful fall back to a more generic translation that still satisfies the locale.

The example embodiments overcome the deficiencies of the related art where localization of message content is limited to messages provided by a cloud service provider. In particular, as described herein a tenant has the power to define new custom events, to decide what events can be triggered (i.e., fire) and when according to policy, as well as deciding the message that is associated with each particular event. The tenant can fully customize the message that is sent with respect to the user, the event and the tenant's policy. The tenant can provide their own translation of their custom messages for as many different languages and locales as they like. The definition of events and custom translatable messages is done at runtime. The delivery of custom event messages by the cloud service to a user in an appropriate locale is done at runtime.

A cloud service may serve multiple tenants. The tenant is a group of users that share a common access with specific privileges to an instance of a cloud service. In a multi-tenant architecture, software may provide each tenant with a dedicated share of the cloud service which is hosted by a cloud platform. In this example, each tenant may have a dedicated share of the instance including respective data, configuration, user management, tenant individual functionality, non-functional properties, and the like. According to various embodiments, each tenant may also implement custom translations for event messages which are implemented within the instance of the cloud service dedicated to the tenant, but not implemented for other tenants that are dedicated other instances of the cloud service. As a result, each tenant can generate their own customize messages and local translations of the messages without affecting other tenants of the cloud service. In contrast, such customization would be difficult to implement in a client-server relationship where each client shares the same instance of the service.

FIG. 1 illustrates a cloud environment 100 providing custom localization-based messages according to example embodiments. Referring to FIG. 1, a cloud platform 120 may provide cloud services such as email, controlled network access, instant messaging, application use, mobile web, and the like, for various tenants of the cloud environment 100. In this example, a client device 110 is associated with a tenant and accesses network devices 130 via a cloud service of the cloud platform 120. Here, the cloud platform 120 may act as a gateway between the client device 110 and the network devices 130. In some embodiments, the cloud platform may include a virtual private network (VPN), or the like, which routes network traffic of the client device 110 through the cloud platform 120. In this example, the client device 110, the cloud platform 120, and the network device 130 may be connected to each other via a network such as the Internet, a private network, and the like.

The cloud services offered by the cloud platform 120 may include a cloud security enforcer application that combines cloud discovery, user analytics, identity and access management, threat prevention, and the like, for its tenants. One capability of the cloud platform 120 is the ability to allow/deny access to web applications according to a tenant's own policy. An end user such as client 110 may install a mobile application of the cloud security enforcer onto the client device 110 and register the device against their tenant. As a part of installing the mobile application, a VPN may be configured such that all network traffic may be routed to through the cloud service of the cloud platform 120 where content analysis and allow/deny access may be performed.

When a new tenant registers with the cloud platform 120 they may be provided their own Point of Presence ("POP"). The POP may include a client gateway (entry point for the mobile traffic) which would forward on the traffic to a network security service application (for content inspection) and then finally route the traffic back out to the internet via the client gateway. The POP may also include a customer controller which acts as an intermediary to the rest of the cloud service components. In this implementation, the POP may act as an event engine and event database. As each tenant has their own POP which contains the event engine and event database, when any individual event engine detects an event, a lookup is made to determine which tenant is associated with that event engine instance. Furthermore, when the client device 110 has installed the CSE mobile application, the mobile application may detect via mobile OS API calls the locale of the client device 110 and send this value to the cloud service during registration which would be saved. Whenever the mobile application retrieves its messages, a locale field may also be sent with the GET request to ensure any changes to the local of the client device 110 are updated.

As further described below in the examples of FIGS. 2-4, the network request from the client device 110 may trigger a custom message in response to a policy being triggered. A policy may be established by a tenant and may be used to restrict access to the network-connected device 130 such as websites, user devices, servers, databases, and the like. In response, the cloud platform 120 may identify a custom message associated with the policy and a locale of the client device 110. Furthermore, the cloud platform 120 may identify a custom translation of the identified message based on the locale of the client device 110, retrieve the custom translation of the message, and provide it to the client device 110. As a result, the client device 110 may receive a tenant-specific and tenant-customized message which may provide various information to the client device 110, for example, that the request has triggered a policy, a notice that the traffic has been blocked, allowed, etc., a warning about the content, a reasons, and the like.

Cloud services which solely do localization at compile time do not allow tenants to customize any messages (as this customizations would be unknown and possibly exhaustive). By allowing tenants to tailor their messages for their organization, end users are more likely to get useful messages and thereby get more value out of the cloud service. This in turn means that the tenant is more likely to use the cloud service more often and continue using it for longer. Another benefit is that as tenants are providing their own messages with their own translations, cloud service providers do not need to spend as many resources ensuring translations are correct and accurate because it is now the tenants responsibility to ensure that their custom messages are accurate for their context.

Furthermore, for cloud services that perform localization at compile time, there is a significant time delay for a new version of a message of the cloud service to be delivered. This is because the message would have to be sent to a translation service to get the different localized versions of the message, which would have to be integrated into the repository of different message, tested and built into a new version of the cloud service and finally deployed. In contrast, the example embodiments are able to instantly deploy a new custom message and its translations so that the tenant can start seeing their custom message immediately.

According to various embodiments, an admin associated with a tenant may create a policy rule and provides a custom message to be associated with the policy rule. At the same time, the admin can also provide their own translation/localization of the custom message for other locales. After this information has been provided to the cloud, the cloud service can detect an event has occurred with respect to particular tenant based on network request/traffic of a client system. The cloud service can also identify a custom message associated with the detected event for the tenant. The cloud service can further look-up a last known locale of the client system to determine locale/translation of the message.

The cloud service may interact with an event engine and a message engine to determine if the custom message associated with the detected event has a custom message for that locale (i.e., did the admin provide a translation/localization of the custom message for this locale during policy creation?) Here, the cloud service may gracefully fall back to more generic locales (i.e., EN-us to EN) and then eventually a default locale. Once a translated version of the message if successfully identified, the cloud service may pull the custom message from the message DB corresponding to the detected event and determined locale. The cloud service may send a push notification to client system with custom message in the last known locale of the client system. In response, the client system may open the notification in the mobile application which triggers a GET request of the specific message, which sends the client system's latest locale along with the request.

Figure 2:
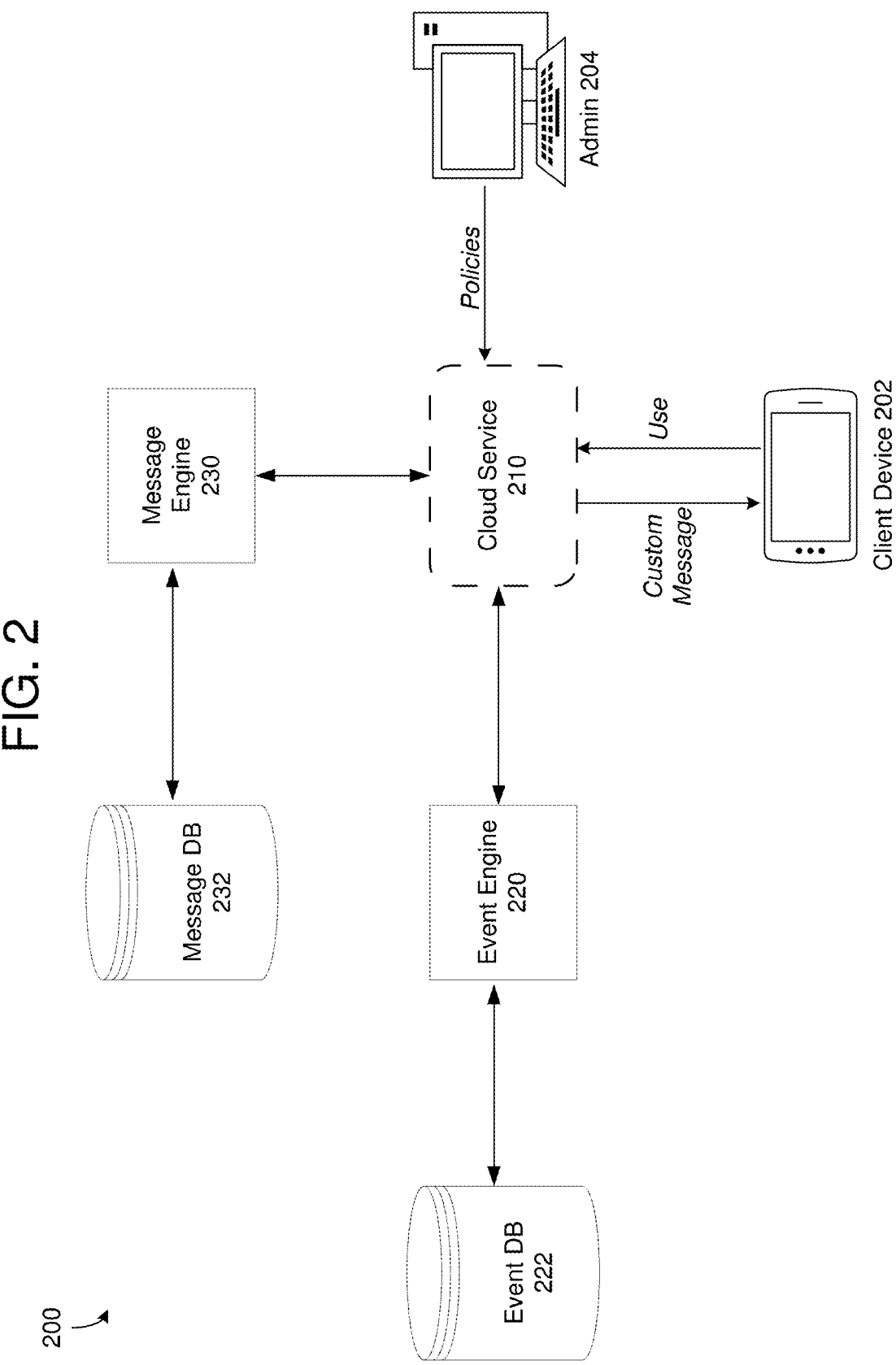
FIG. 2 is a diagram illustrating a cloud service process for providing a custom localized message according to example embodiments.

FIG. 2 illustrates a process 200 of a cloud service 210 providing a custom localized message according to example embodiments. In this example, a tenant has a dedicated instance of the cloud service 210. Referring to the example of FIG. 2, an administrator 204 of the tenant may create and/or upload policies to a cloud platform which hosts an instance of a cloud service 210. The policies may include certain types of traffic (e.g., user, user group, IP address geography destination, website name, application name, category of content, etc.) which is flagged for client systems of the tenant. The policy information may also specify actions that can be taken by the cloud service 210 in response to detecting a type of traffic from a client of the tenant. Actions may include allowing the traffic, blocking the traffic, transmitting a warning to the client, transmitting another type of message to the client, notifying an admin, and the like. The policy information may be propagated from the cloud service 210 to an event database 222 and a message database 232 via an event engine 220 and a message engine 230, respectively.

In this example, a creation of a policy and message flow may start with the administrator 204 interacting with the cloud service 210 to define a custom event and a message corresponding to the event (with potential translations) for a tenant. The administrator 204 may insert policy information and custom messages (and translations) into a user interface which is connected to the cloud service 210. The policy factors are then translated by the event engine 220 into events that will be deployed by the event engine 220. The cloud service 210 keeps an internal mapping between the unique ID of the custom event defined by the admin 204 and the unique event ID of the underlying event engine 220. The event engine 220 then deploys the new events to the event database 222. Furthermore, the cloud service 210 may insert a custom message for each locale/translation into the message database 232 via the message engine 230 for the supplied languages. The cloud service 210 may also keep an internal mapping between the unique ID of a custom event defined by the admin 204 and the unique ID that defines the corresponding custom messages in the message DB 232. Each tenant may have their own event engine 220 and message engine 230, as well as corresponding event database 222 and message database 232.

Once the policies are stored within the event DB 222 and the message DB 232, network traffic from client device 202 may trigger custom messages based on a locale of the client device 202. For example, the client device 202 may use the cloud service 210 in such a way that the event engine 220 detects a policy has been triggered and fires a corresponding event such as a block, allow, warn, and a message. The cloud service 210 may look up the internal mapping between the underlying unique event ID and the unique ID of the policy event defined by the admin 204 in the first flow where a policy is defined by the admin 204. The cloud service 210 may then look up the internal mapping between the policy event defined by the admin 204 in the first flow and the custom message associated with that event to get the unique message ID. Here, the cloud service 210 may then query the message engine 232 for the custom message of the event based on the client's locale. The custom translated message is retrieved from the message DB 232 by the message engine 230 and returned to the cloud service 210. Messages may optionally have parameters which may be translatable in which case the cloud service 210 cycles back to get the correct translation of the message parameters from the message DB 232. Finally, the message is sent to the client device 202 in a preferred locale informing the user of the client device 202 of the event.

In some embodiments, the identified locale of the client device 202 may not have a predefined message translation stored within the message DB 232. In this example, the cloud service may gracefully fallback to a more generic message translation in incremental steps. For example, translation specificity may be defined such that a German-English locale may fall back on a European-English locale. If, in this example, the German-English translation is not present in the message DB 232 (e.g., not provided by admin 204), the cloud service 210 can request a more generic version of the translation such as the European-English translation. If the European-English translation is not present in the message DB 232, the cloud service 210 can fall back again to the next generic version such as standard English. Here, the message DB 232 may provide the standard English definition of the message to the cloud service 210 for transmittal to the client device 202 (located in a German-English locale). By gracefully falling back to more generic messages, the cloud service 210 can accommodate for situations in which a tenant has not provided specific translations for all locales.

In the architecture of the example of FIG. 2, the tenant may be provided with a dedicated instance of the cloud service 210 as well as a point of presence (POP) which includes the event engine 220, event DB 222, message engine 230, and message DB 232. Each tenant may have their own POP along with the event engine 220, event DB 222, message engine 230, and message DB 232. As another example, the event engine 220 and the message engine 230 may be combined into a policy engine which communicates with both of the event DB 222 and the message DB 232.

It should be appreciated that the architectures described herein are for purposes of example only and are not meant to limit the architecture of the example embodiments. As another example, an event DB and a message DB may be decoupled from a tenant, and used for multiple tenants. In this example, a global DB may include the event DB and the message DB at a single location and may be used to store tenant message customizations. Here, each instance of the cloud service may communicate with a common DB including the global event DB and the global message DB. As another example, the custom message translation process may be implemented via a cloud application that serves only a single tenant. In this architecture, the customization may be implemented by the application itself without the need for a cloud service or an event DB, message DB, etc. As another example, the event DB and the message DB may be incorporated into a single DB. It should also be appreciated that other architectures are possible, and are not to be limited to what is specifically described in the examples herein.

Figure 3:
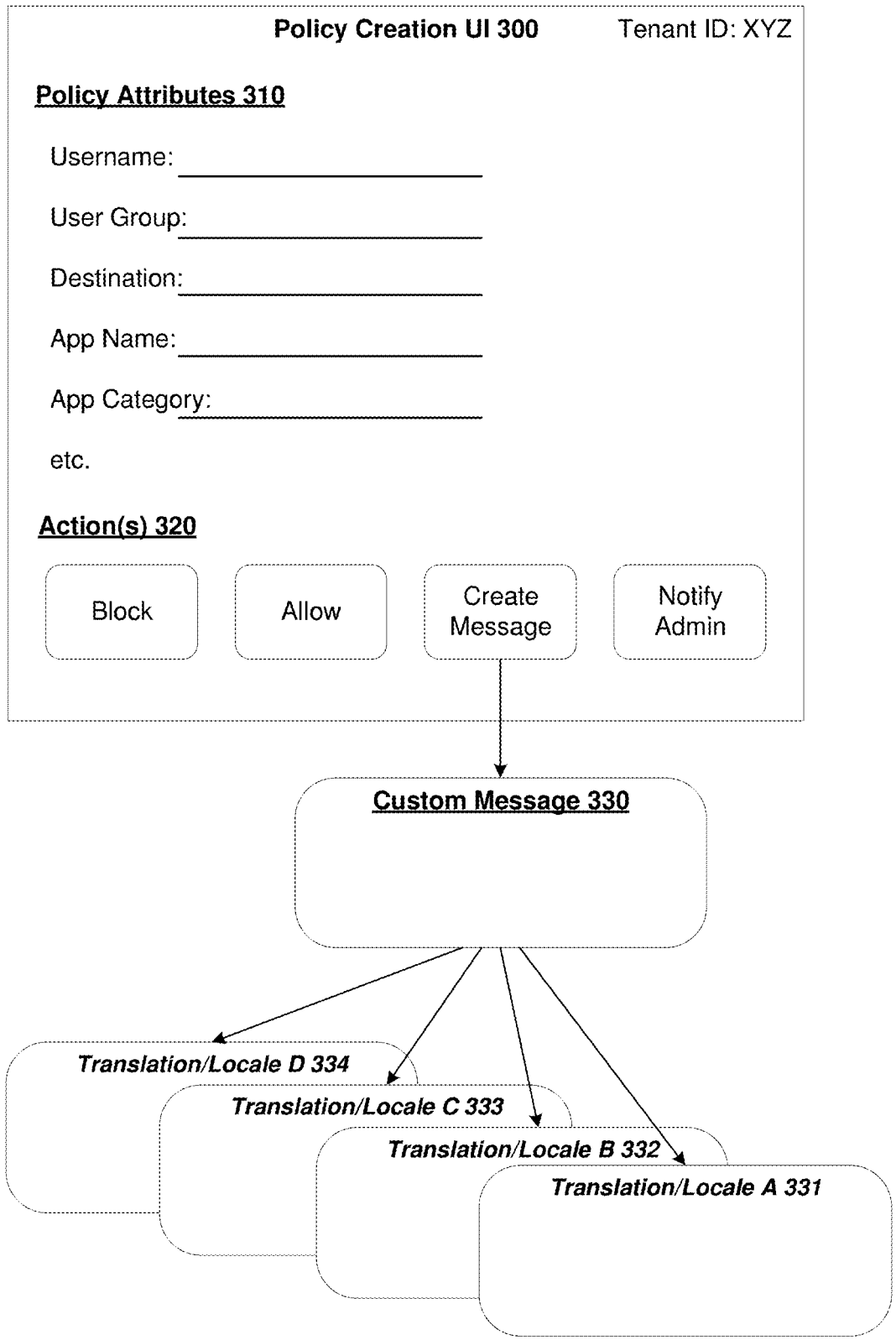
FIG. 3 is a diagram illustrating a user interface for configuring custom localized messages according to example embodiments.

FIG. 3 illustrates a user interface 300 for configuring custom localized messages according to example embodiments. Referring to FIG. 3, an admin may interact with the user interface 300 to create new policies, create new custom messages, and create new custom translations of the messages. Policies may have one or more attributes 310 which when detected cause one or more actions 320 to be triggered. The attributes 310 may include a username such as a name of the end user associated with enrolled mobile device generating the traffic flow, a user group such as a customer defined collection of users (e.g., marketing department, development team, etc.), a destination geographical location such as a country that is associated with the destination IP address of the network request, an application name such as an application associated with the URL (e.g., Salesforce, Netflix, etc.), an application category such as a category classification of the application associated with the URL (e.g., gambling, cinema, television, etc.), and the like.

Network requests (traffic) from a client system may be routed through the cloud service or cloud platform and analyzed for events. For example, all end user traffic may be routed through an IBM QRadar Network Protection (XGS) appliance where the XGS performs inspection and can trigger rules based on the source, destination and content of the traffic flow. The XGS may use a deep content analysis (DCA) module that uses X-Force data to determine application name, application category and geographic location of the web request. To determine user information of the source of the traffic flow, the service may create a mapping of the VPN connection created during end user device registration against user information provided during end user registration.

Various actions that can be taken when one or more of the attributes 310 are detected may include a block action which does not allow the traffic flow to continue. A "reject" signal may sent to both ends of the connection to make them aware of the intervention (i.e., as opposed to dropping the traffic silently). Another action is to allow the request and let the traffic flow continue. Other actions include a notify administrator action which can be used to send notification to all devices enrolled for the identified administrators, and/or a send message to user action which can send a notification to the device that generated the traffic flow.

Furthermore, as shown in FIG. 3, a user may select to create custom messages 330 and custom translations of the message 331-334 for different locales/languages. Here, an admin or other user may create a customized message for the cloud service to use when handling policy violations, restrictions, and the like. Here, the user may input text in words, characters, sentences, numbers, and the like, to create a custom message which is linked to a particular policy event. Furthermore, translations can be similarly customized. The custom message 330 and the customized translations 331-334 may be stored in the message DB and may be triggered by events detected from the event DB.

Figure 4:
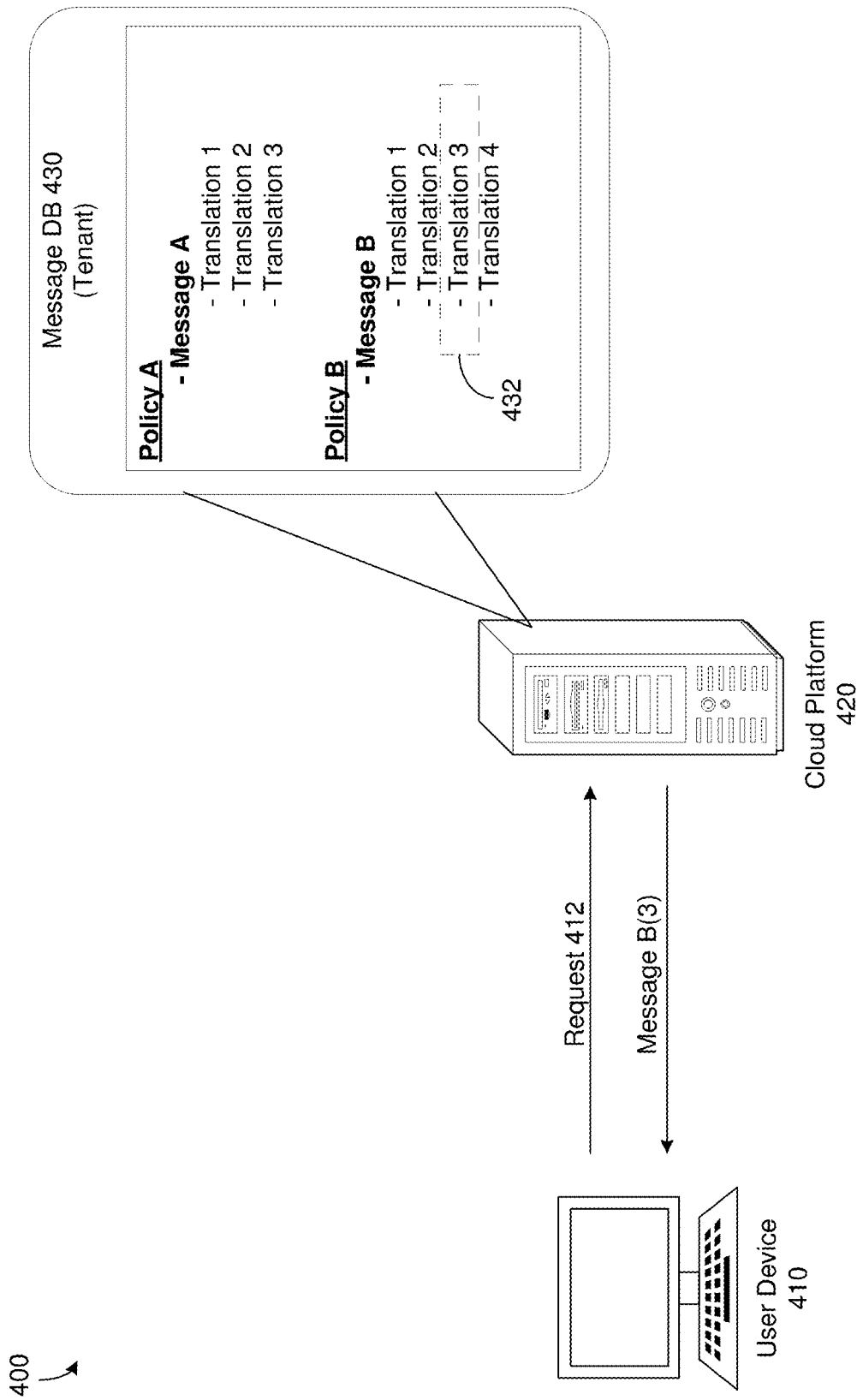
FIG. 4 is a diagram illustrating a database storing custom messages per locale according to example embodiments.

FIG. 4 illustrates a message database 400 storing custom messages per locale according to example embodiments. The message database 400 may be any type of storage that can be queried using a message ID, a locale, and the like. Here, a network request 412 is received by a cloud platform 420 from a user device 410. In response, the cloud platform 420 may detect that an event has occurred due to a policy violation or triggering. In response, the cloud platform 420 may retrieve an appropriate message for the detected policy from a message database 430 based on a locale of the user device 410. In this case, the message DB 430 is specific to the tenant. Here, the cloud platform identifies a message B and a translation 432 of the message B for transmission to the user device in response to the detected event.

To meet internationalization requirements in Mobile Push Notifications a mobile API of the cloud service may use Extensible Markup Language (XML) bundles for storing translations. However, an XML schema is just one example and is not meant to limit the types of storage schema that can be used to store custom message which may include JavaScript Object Notation (JSON), Yet Another Multicolumn Layout (YAML), and the like. The messages may be stored in any type of message database which can be queried by a message ID and/or locale. XML bundles containing the translations that may be used by the Mobile API may be put into the message database. Translations may be split into multiple XML bundles to simplify ownership responsibility and update. The division may be done firstly by the type (Event or Message), then by component, and then finally by locale. The locale division may be performed to divide by language, the design does however support XML bundles which contain translations for any specific flavor of language (script, country, and variant). When a translated string is not found for a specific locale, then a more generic locale may be searched, and so on until finally the root bundle is used. There are two complexities that have been added to the translation above what is normal. For example, parameter translation catalogues may be used (e.g., a catalogue to translate application names used as parameters inside other catalogue messages). In addition, a concept of customized messages that can be provided by the tenant through the visualization component is provided and may be tenant specific.

Each individual XML bundle may be placed at an individual node in the message DB. When creating or maintaining an entry in the translation bundles, the path to the appropriate node can be determined unambiguously using the first part of the translation key and the least specific locale that the translation is intended for. If an entry is placed in a bundle location that deviates from this design then it may not be found, or may cause unexpected behavior (e.g., if its bundle is loaded and cached for other translation searches then the deviate entry may only be found.) When searching for a translation at runtime, the most specific locale that is available for the translation may be unknown. Locale bundles may be searched in most-to-least specific order until the first available translation is found; this will be the most specific translation of the searched key that is available for the current user locale.

Only the root catalog, and those which have translated strings within them may be created (or uploaded to the message DB). There is no requirement for a catalog to exist in the message DB for every supported locale for each Event and Message partition. One of the benefits of the example embodiments is the ability to perform a graceful fallback of the translation/locale, and thus translation retrieval may attempt to find translation strings for increasingly more generic locales, then eventually for the root locale, before giving up. It is recommended to avoid creation of 'empty' catalogs (e.g. to represent a supported language where no translation has been performed yet, or for the English language which is represented fully by the root catalog) as there is some overhead with retrieval of a translation string for each candidate bundle that must be processed for search.

Figure 5:
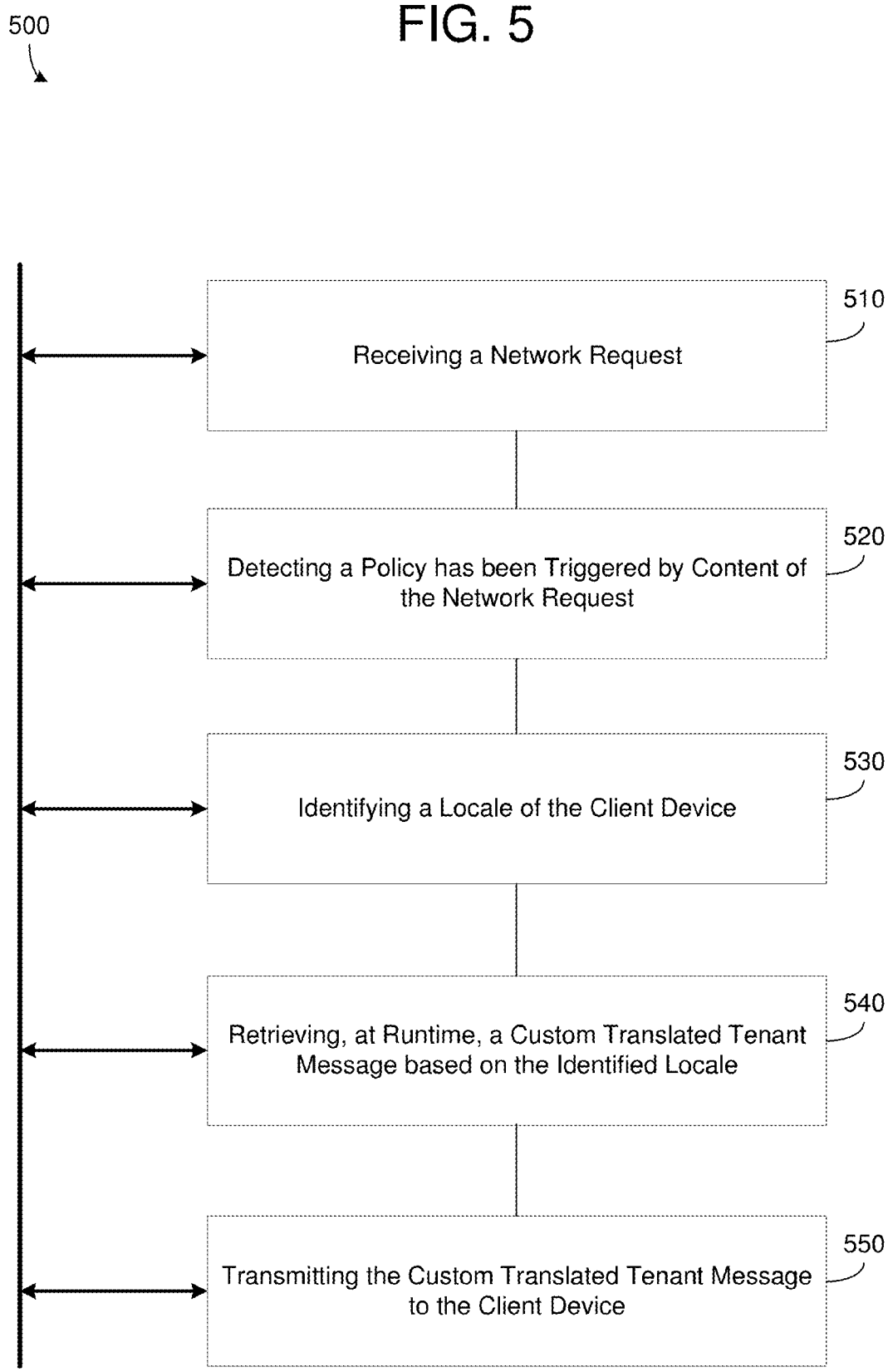
FIG. 5 is a diagram illustrating a method for providing custom localization-based messages according to example embodiments.

FIG. 5 illustrates a method 500 for providing custom localization-based messages according to example embodiments. For example, the method 500 may be performed by a cloud service, a cloud platform, a server, and the like. Referring to FIG. 5, in 510, the method may include receiving a network request from a client device. For example, the network request may include an input submitted via a web browser such as a request for a uniform resource locator (URL), an IP address, and the like. The request may be received from a client device that is included in a plurality of client devices managed by a tenant of a cloud service which manages multiple tenants.

In 520, the method may include detecting that a pre-established policy of a tenant has been violated or otherwise triggered based on content included in the received network request. The policy may be one of a plurality of policies which have been created by an administrator of the tenant. As another example, the policy may be a standard policy that is applied to all tenants. Examples of policies that can be violated include a user accessing a network, a user group accessing a network, a geographical destination of the IP address, a category of content/application (e.g., sports, gambling, pornography, etc.), website name or application name, and the like. Different actions can be taken when a policy is detected/violated. For example, content may be allowed, content may be blocked, messages may be generated, an admin may be notified, and the like. In the example embodiments, the cloud service may determine that a message is to be transmitted to the client, in response to the policy being violated in 520.

In 530, the method may include identifying a locale of the client device. For example, the locale may be initially registered by a user of the user device. As another example, the locale of the client device may be identified based on application programming interface (API) calls made to an operating system on the client device. Here, the client device may install a mobile application for using the cloud service, and the mobile application may detect, via mobile OS API calls, the user's locale and send this value to the cloud service during registration which may be saved. As another example, the locale of the client device may updated based on a locale field included in the network request received in 510. Each time a message retrieval request (e.g., HTTP GET, HTTP POST, etc.) is sent from the client device, the message retrieval request may include a locale field that is populated by the client device based on a detected locale, a network location, a GPS coordinate, or the like.

In 540, the method may include retrieving, at runtime, a tenant message in response to the triggered policy and a custom translation of the tenant message based on the identified locale, and in 550, transmitting the custom translation of the tenant message to the client device. For example, the retrieving may include retrieving, at runtime, a tenant-provided message from a database storing a plurality of tenant-provided messages associated with a plurality of pre-established policies. The tenant message may include a plurality of custom translations for a plurality of different locales. In some embodiments, the retrieving may include retrieving a translation of the tenant message for a generic locale in response to a translation of the identified locale not being available. In some embodiments, the custom translation of the tenant message is uploaded by the cloud tenant to a cloud service via a user interface.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 6 illustrates an example computer system architecture 600, which may represent or be integrated in any of the above-described components, etc.

Figure 6:
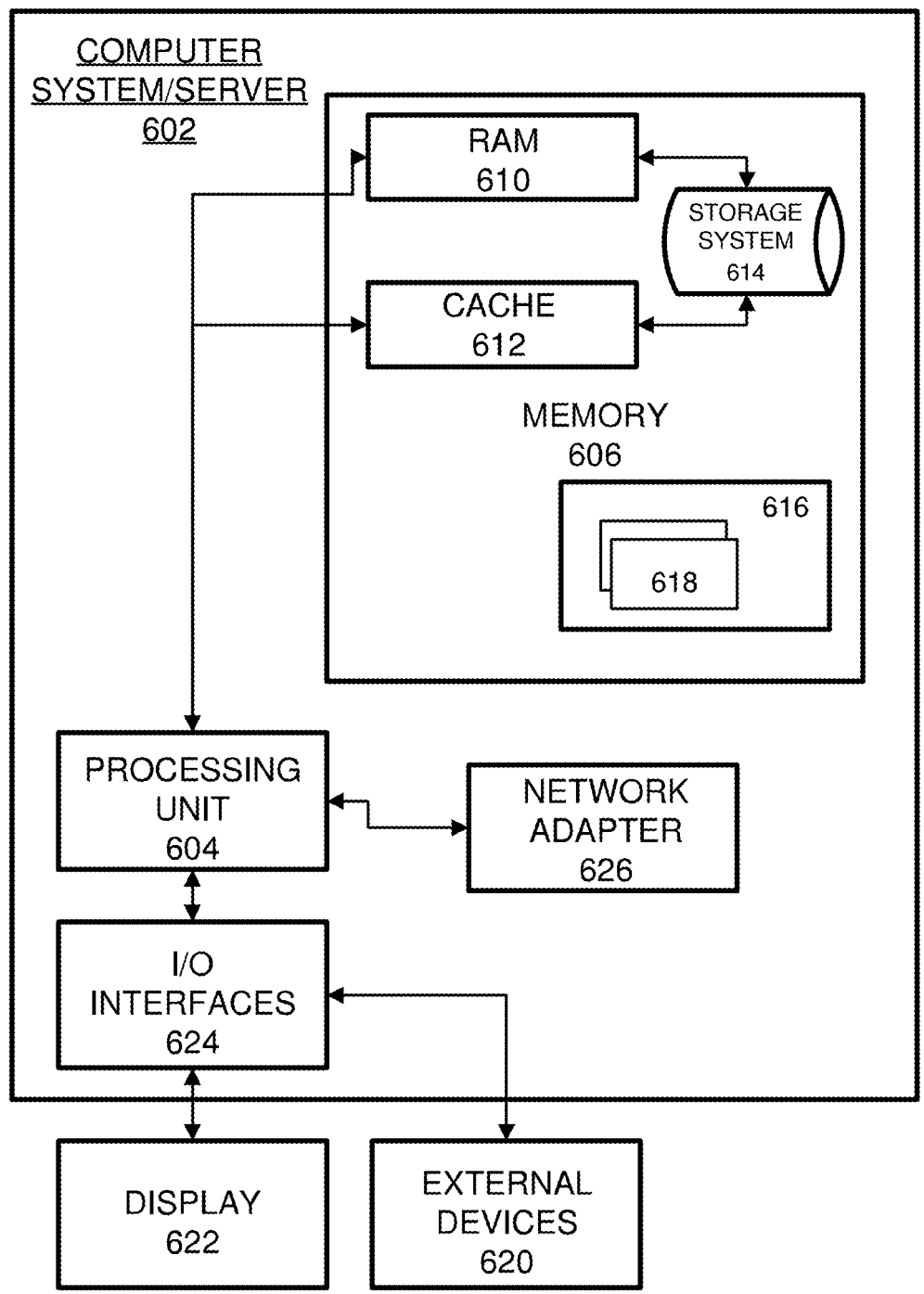
FIG. 6 is a diagram illustrating a computer system configured to support one or more of the example embodiments.

FIG. 6 is not intended to suggest any limitation as to the scope of use or functionality of embodiments of the application described herein. Regardless, the computing node 600 is capable of being implemented and/or performing any of the functionality set forth hereinabove. For example, the computing node 600 may be a network server of a larger enterprise network that connects multiple user workstations to the Internet, a private network, or the like.

In computing node 600 there is a computer system/server 602, which is operational with numerous other general purpose or special purpose computing system environments or configurations. Examples of well-known computing systems, environments, and/or configurations that may be suitable for use with computer system/server 602 include, but are not limited to, cloud computing platforms, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed computing environments that include any of the above systems or devices, and the like.

Computer system/server 602 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 602 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 602 in cloud computing node 600 is shown in the form of a general-purpose computing device. The components of computer system/server 602 may include, but are not limited to, one or more processors or processing units (processor) 604, a system memory 606, and a bus that couples various system components including the system memory 606 to the processor 604.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 602 typically includes a variety of computer system readable media. Such media may be any available media that is accessible by computer system/server 602, and it includes both volatile and non-volatile media, removable and non-removable media. System memory 606, in one embodiment, implements the flow diagrams of the other figures. The system memory 606 can include computer system readable media in the form of volatile memory, such as random-access memory (RAM) 610 and/or cache memory 612. Computer system/server 602 may further include other removable/non-removable, volatile/non-volatile computer system storage media. By way of example only, storage system 614 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 606 may include at least one program product having a set (e.g., at least one) of program modules that are configured to carry out the functions of various embodiments of the application.

Program/utility 616, having a set (at least one) of program modules 618, may be stored in memory 606 by way of example, and not limitation, as well as an operating system, one or more application programs, other program modules, and program data. Each of the operating system, one or more application programs, other program modules, and program data or some combination thereof, may include an implementation of a networking environment. Program modules 618 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 602 may also communicate with one or more external devices 620 such as a keyboard, a pointing device, a display 622, etc.; one or more devices that enable a user to interact with computer system/server 602; and/or any devices (e.g., network card, modem, etc.) that enable computer system/server 602 to communicate with one or more other computing devices. Such communication can occur via I/O interfaces 624 (which may be referred to herein as an output and/or an input). Still yet, computer system/server 602 can communicate with one or more networks such as a local area network (LAN), a general wide area network (WAN), and/or a public network (e.g., the Internet) via network adapter 626. As depicted, network adapter 626 communicates with the other components of computer system/server 602 via a bus. It should be understood that although not shown, other hardware and/or software components could be used in conjunction with computer system/server 602. Examples, include, but are not limited to: microcode, device drivers, redundant processing units, external disk drive arrays, RAID systems, tape drives, and data archival storage systems, etc.

According to various embodiments, the network interface 626 may receive a network request from a client device. The processor 604 may detect that a pre-established policy of a cloud tenant has been violated or otherwise triggered based on content included in the received network request. Furthermore, the processor 604 may identify a locale of the client device, and retrieve, at runtime, a tenant message in response to the triggered policy and a custom translation of the tenant message based on the identified locale. Furthermore, the processor 604 may control the network interface 626 to transmit the custom translation of the tenant message to the client device in response to the policy being triggered.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A computing system comprising:
   a network interface configured to receive, via an access point of a cloud platform, a network request from a client device associated with a cloud service; and
   a processor configured to
      identify a tenant of the client device, from among multiple tenants that are provided the cloud service, based on the access point;
      detect an event based on a policy created by the tenant that is triggered due to content included in the received network request,
      identify a locale of the client device, and
      identify, at runtime, a predefined custom tenant message that provides a custom notification defined by the tenant about the policy created by the tenant, wherein the predefined custom tenant message is identified based on the identified tenant from among the multiple tenants, an event identifier corresponding to the event, and the identified locale,
   wherein the processor is further configured to control the network interface to transmit the custom translation of the predefined custom tenant message to the client device.

2. The computing system of claim 1, wherein the policy comprises a policy restriction that is based on network traffic within the network request and the predefined custom tenant message comprises at least one of a notification that the network traffic is blocked by the tenant and a notification that the network traffic is allowed by the tenant.

3. The computing system of claim 1, wherein the processor is configured to identify the locale of the client device based on application programming interface (API) calls made to an operating system on the client device.

4. The computing system of claim 1, wherein the processor is configured to identify an update to the locale of the client device based on a locale field included in the network request.

5. The computing system of claim 1, wherein the processor is configured to retrieve, at runtime, the predefined custom tenant message from a database that stores a plurality of predefined tenant-provided messages associated with a plurality of pre-established policy restrictions on network traffic.

6. The computing system of claim 1, wherein the predefined custom tenant message comprises a plurality of custom translations for a plurality of different locales.

7. The computing system of claim 6, wherein the processor is configured to retrieve a translation of the predefined custom tenant message for a generic locale in response to a determination that a translation of the identified locale is not available.

8. The computing system of claim 1, wherein the custom translation of the predefined custom tenant message is uploaded by the tenant to a tenant instance of the cloud service via a user interface.

9. The computing system of claim 1, wherein the processor is configured to query a message database of the identified tenant from among multiple messages databases of the multiple tenants, based on an event identifier and the identified locale.

10. A method comprising:
receiving, via an access point of a cloud platform, a network request from a client device associated with a cloud service;
identifying a tenant of the client device, from among multiple tenants that are provided the cloud service, based on the access point;
detecting an event based on a policy created by the tenant that is triggered due to content included in the received network request;
identifying a locale of the client device;
identifying, at runtime, a predefined custom tenant message that provides a custom notification defined by the tenant about the policy created by the tenant, wherein the predefined custom tenant message is identified based on the identified tenant from among the multiple tenants, an event identifier corresponding to the event, and the identified locale; and
transmitting the custom translation of the predefined custom tenant message to the client device.

11. The method of claim 10, wherein the policy comprises a policy restriction that is based on network traffic within the network request and the predefined custom tenant message comprises at least one of a notification that the network traffic is blocked by the tenant and a notification that the network traffic is allowed by the tenant.

12. The method of claim 10, wherein the locale of the client device is identified based on application programming interface (API) calls made to an operating system on the client device.

13. The method of claim 10, wherein the locale of the client device is updated based on a locale field included in the network request.

14. The method of claim 10, wherein the retrieving comprises retrieving, at runtime, the predefined custom tenant message from a database storing a plurality of predefined tenant-provided messages associated with a plurality of pre-established policy restrictions.

15. The method of claim 10, wherein the predefined custom tenant message comprises a plurality of custom translations for a plurality of different locales.

16. The method of claim 15, wherein the retrieving comprises retrieving a translation of the predefined custom tenant message for a generic locale in response to a translation of the identified locale not being available.

17. The method of claim 10, wherein the custom translation of the predefined custom tenant message is uploaded by the tenant to a tenant instance of the cloud service via a user interface.

18. A non-transitory computer readable medium comprising instructions, that when read by a processor, cause the processor to perform a method comprising:
receiving, via an access point of a cloud platform, a network request from a client device associated with a tenant of a cloud service;
identifying a tenant of the client device, from among multiple tenants that are provided the cloud service, based on the access point;
detecting an event based on a policy created by the tenant that is triggered due to content included in the received network request;
identifying a locale of the client device;
identifying, at runtime, a predefined custom tenant message that provides a custom notification defined by the tenant about the policy created by the tenant, wherein the predefined custom tenant message is identified based on the identified tenant from among the multiple tenants, an event identifier corresponding to the event, and the identified locale; and
transmitting the custom translation of the predefined custom tenant message to the client device.

19. The non-transitory computer readable medium of claim 18, wherein the policy comprises a policy restriction that is based on network traffic within the network request and the predefined custom tenant message comprises at least one of a notification that the network traffic is blocked by the tenant and a notification that the network traffic is allowed by the tenant.

20. The non-transitory computer readable medium of claim 18, wherein the locale of the client device is identified based on application programming interface (API) calls made to an operating system on the client device.

21. The non-transitory computer readable medium of claim 18, wherein the retrieving comprises retrieving, at runtime, the predefined custom tenant message from a database storing a plurality of predefined tenant-provided messages associated with a plurality of pre-established policies.

22. The computing system of claim 1, wherein the predefined custom tenant message is unique to a tenant instance of the cloud service from among multiple different tenant instances of the cloud service.

* * * * *